No. 812,342. PATENTED FEB. 13, 1906.
W. T. HORNE.
COW, CALF, AND COLT WEANER.
APPLICATION FILED AUG. 17, 1905.
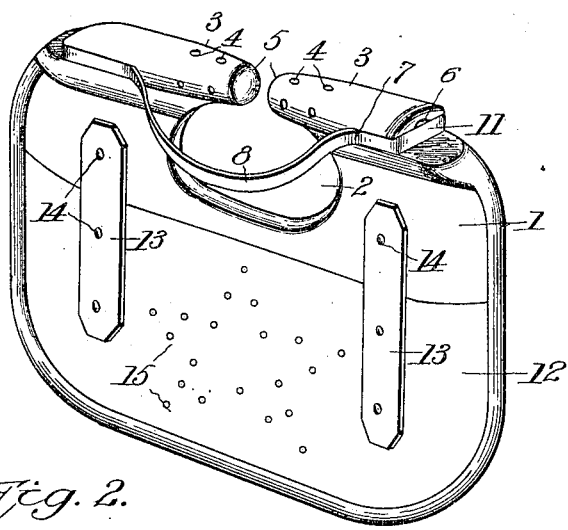
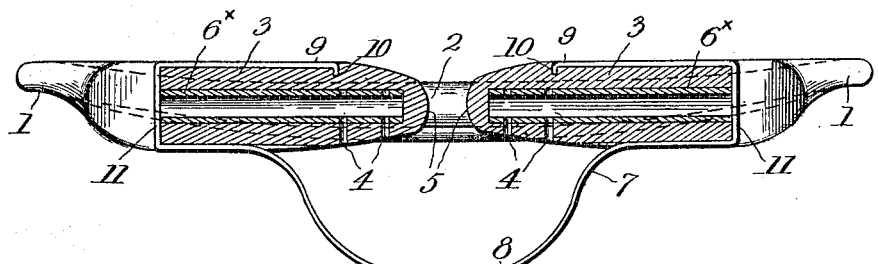
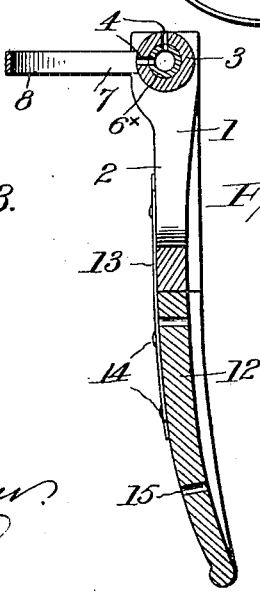
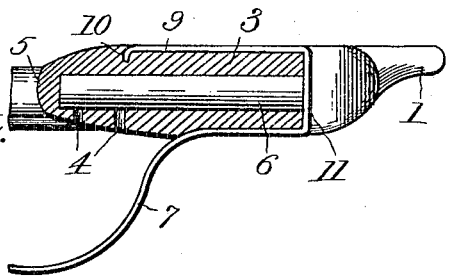
Witnesses
Inventor
William Thornbrough Horne
by
Attorney

UNITED STATES PATENT OFFICE.

WILLIAM THORNBROUGH HORNE, OF HILLSBORO, TEXAS.

COW, CALF, AND COLT WEANER.

No. 812,342. Specification of Letters Patent. Patented Feb. 13, 1906.

Application filed August 17, 1905. Serial No. 274,622.

*To all whom it may concern:*

Be it known that I, WILLIAM THORNBROUGH HORNE, a citizen of the United States, residing at Hillsboro, in the county of Hill and State of Texas, have invented a certain new and useful Improvement in Cow, Calf, and Colt Weaners, of which the following is a full, clear, and exact description.

The object of this invention is to provide a weaner for cows, calves, and colts particularly which may be worn with the least possible inconvenience by the animal and by means of which a medicinal remedy, antiseptic, or the like may be administered.

The invention comprises a member provided with prongs that may be inserted in the nostrils, said prongs made hollow and perforated laterally and adapted to receive stiffening members, such as solid pins or tubes adapted to contain a remedial agent or the like, these stiffening pins or tubes being held in place by a bow-spring, which at the same time prevents the animal from throwing the device out of place.

The invention further comprises a detachable member, so that if the member which is applied directly to the animal's nose be made of soft rubber the other member may be made of less expensive material and renewed at pleasure at a slight cost.

In the accompanying drawings, illustrating the invention, in the several views of which like parts are similarly designated, Figure 1 is a perspective view. Fig. 2 is a horizontal section on a larger scale, taken on a plane in the center of the nostril-prongs. Fig. 3 is a vertical section taken through one of the prongs of Fig. 2. Fig. 4 is a horizontal section of one of the nostril-prongs, showing another form of stiffening member.

The member 1 may be made of rubber of suitable dimensions and configuration to engage the animal's nostrils and with a central opening 2. The upper edge of this member is made with prongs 3 of cylindrical outline and hollow and provided with lateral perforations 4. The adjacent ends 5 of these prongs are closed, while their opposite ends are open, as shown more particularly in Fig. 2. The member 1 and its prongs are preferably made of soft rubber, and the prongs are of sufficient rigidity to maintain engagement with the nostrils of the animal and yet sufficiently soft to prevent irritation of the nostrils. The prongs may be made additionally rigid by inserting therein stiffening members, such as solid pins 6, Fig. 4, or tubes $6^\times$, Fig. 2, and these tubes $6^\times$ are also perforated, as shown, and the pins or tubes are held in place by means of a bow-spring 7, having the bow portion 8 extending out in front of the member 1 and adapted to engage the muzzle, so as to prevent the animal from displacing the device, and having end loops embracing the prongs and provided with flanged ends 9, which are sprung into notches 10 in the rear sides of the prongs. The ends 11 of the spring serve to hold the stiffening pins or tubes within the prongs. The stiffening members when constructed as tubes may be utilized to receive vaccine, a remedial agent, or antiseptic to be administered to the animal. The stiffening pins or tubes may be constructed of wood, metal, or any other suitable or desired material.

The construction and arrangement of the spring admits of its ready removal, so as to gain access to the stiffening pins or tubes and for removal of the spring when worn or broken.

The lower part 12 of the device may be made of fiber, paper, or any other suitable material cheaper than rubber and renewed at pleasure; but of course it may also be made of rubber and, if desired, integral with the upper part. When made as a separate member, this lower part 12 may be applied to the upper part by metallic strips 13, fastened to it and to the upper part by rivets, brads, or other soft-metal devices 14 and in such way that the fastenings may be cut in order to detach the lower part from the upper part for renewal purposes. As shown, this lower part 12 may be perforated at 15 for ventilation.

As indicated in Fig. 2 by dotted lines and in Fig. 3 by full lines, the device is concaved longitudinally and transversely, so as to conform as closely as possible to the animal's muzzle.

What I claim is—

1. A weaner, provided with nostril-engaging prongs made hollow and having stiffening members inserted therein.

2. A weaner, having nostril-engaging prongs made hollow and perforated laterally, and having stiffening-tubes also perforated and adapted to contain medicinal or other remedial agents or the like.

3. A weaner, having nostril-engaging prongs made hollow and provided with stiffening members, and means to hold such stiffening members in place.

4. A weaner, having nostril-engaging prongs made hollow and provided with stiffening members, and a bow-spring engaging said prongs and adapted to retain the stiffening members in place.

5. A weaner, having nostril-engaging prongs made hollow and having stiffening members inserted therein, and a lower detachable and renewable portion.

6. A weaner, having a nostril-engaging portion of soft rubber provided with hollow prongs containing stiffeners and a detachable lower portion of paper or other inexpensive material.

In testimony whereof I have hereunto set my hand this 12th day of August, A. D. 1905.

WILLIAM THORNBROUGH HORNE.

Witnesses:
W. S. GIVENS,
T. C. BRANNAN,